US005180592A

United States Patent [19]
Laurent

[11] Patent Number: 5,180,592
[45] Date of Patent: Jan. 19, 1993

[54] SELF-LOCKING SECTOR-TYPE MOLD FOR THE VULCANIZATION OF TIRES

[75] Inventor: Daniel Laurent, Meylan, France

[73] Assignee: Compagnie Generale des Etablissements Michelin—Michelin & Cie, Clermont-Ferrand Cedex, France

[21] Appl. No.: 617,656

[22] Filed: Nov. 26, 1990

[30] Foreign Application Priority Data
Jan. 2, 1990 [FR] France .................. 90 00039

[51] Int. Cl.⁵ ............... B29C 35/02; B29D 30/52
[52] U.S. Cl. ............................ 425/46; 425/47
[58] Field of Search ............... 425/46, 28.1, 47, 54, 425/55

[56] References Cited
U.S. PATENT DOCUMENTS

| 3,787,155 | 1/1974 | Zangl | 425/47 |
| 3,833,323 | 9/1974 | Pasch | 425/47 |
| 3,990,823 | 11/1976 | Le Moullac | 425/47 |
| 4,883,415 | 11/1989 | Salvadori | 425/47 |

FOREIGN PATENT DOCUMENTS

| 1301779 | 7/1962 | France . | |
| 2087540 | 12/1971 | France . | |
| 0182415 | 11/1982 | Japan | 425/46 |
| 0891472 | 12/1981 | U.S.S.R. | 425/47 |

Primary Examiner—Willard E. Hoag
Attorney, Agent, or Firm—Brumbaugh, Graves, Donohue & Raymond

[57] ABSTRACT

A sector-type mold for the molding and vulcanizing of tires, having shells (2) and the sectors (1) which cooperate to withstand the internal molding pressure and remain in closed position without the assistance of additional wedging or holding parts.

2 Claims, 2 Drawing Sheets

SELF-LOCKING SECTOR-TYPE MOLD FOR THE VULCANIZATION OF TIRES

BACKGROUND OF THE INVENTION

The present invention relates to a new type of sector mold for tires.

The conventional molds consist of several separate parts which, when brought together, define a quasi-toroidal molding space. They essentially have two shells for the molding of the tire walls and a plurality of peripheral sectors located between the shells for the molding of the tread. The bringing together of all these parts is assured by a suitable kinematic system by means of a suitable mechanism. The raw blank of the future tire must be firmly applied and held against the mold in order to obtain precise geometrical dimensions and architecture and in order, if necessary, to impress the sculpturing in the tread. As a result, the blank exerts a substantial pressure on the parts of the mold, which pressure (referred to as internal pressure) tends to open the mold and, therefore, to separate its parts.

There are known systems which hold the mold firmly closed by the combined or separate action of hydraulic or pneumatic jacks and mechanical wedging parts, such as for example peripheral rings, which transfer the resting onto the structure of the press via the mold closing mechanism. In order to obtain quality manufacture, it is necessary to develop substantial closing force. Therefore, all the parts which assure the kinematic system of the mold must be dimensioned so as not to suffer deformation. As a result of this, a mold-press unit is a heavy and expensive machine.

SUMMARY OF THE INVENTION

The purpose of the present invention is to contain the internal molding pressure at the level of the mold.

The sector-type mold of the invention for the molding and vulcanizing of tires is characterized by the fact that the shells and sectors cooperate to withstand the internal pressure and to remain in closed position without the assistance of additional wedging or holding parts.

BRIEF DESCRIPTION OF THE DRAWINGS

The invention will be better understood by reference to the detailed description which follows and to the accompanying drawings in which:

FIG. 2 illustrates a preferred but non-limitative embodiment of the invention, as compared with the conventional design shown diagrammatically in FIG. 1.

DESCRIPTION OF PRIOR ART

Figure 1:
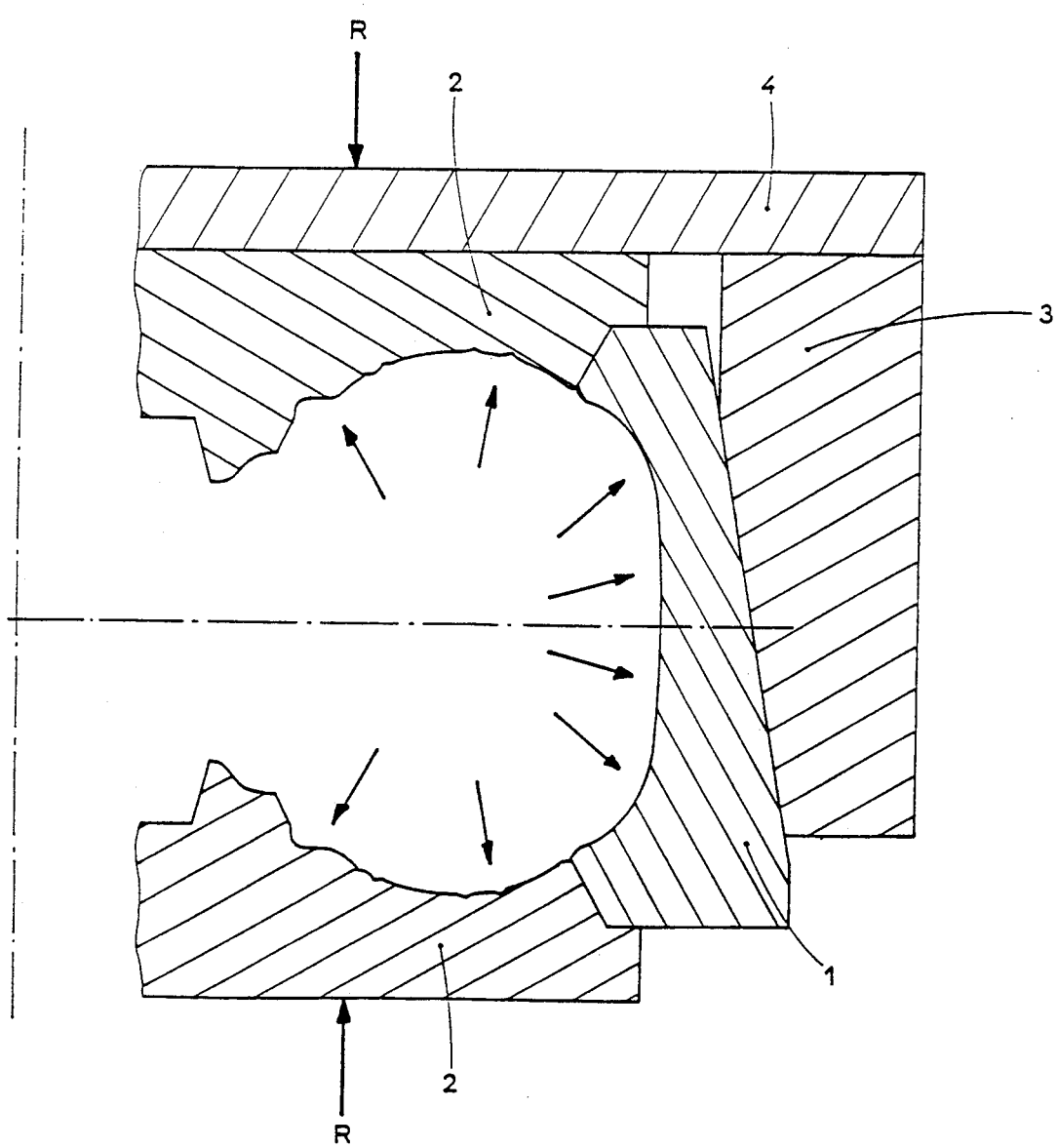
FIG. 1 is a cross-sectional view of a conventional sector-type mold taken on a radial plane.

All the types of molds known up to the present time have the following feature in common: If they are not held firmly in position, the component parts, namely shells 2 and sectors 1, may move apart under the effect of the internal pressure. This is illustrated in FIG. 1 which shows one of these molds in which the radial displacement of the sectors is controlled by the axial displacement of a ring 3 borne by a plate 4. The normal opening movement of such a mold is effected by a radial moving apart of the sectors 1 caused by an axial displacement of the plate 4 with the ring 3 and then a relative axial movement apart of the shells 2. For further details regarding this type of convention mold reference may be had to French Patent No. 2108745.

DESCRIPTION OF THE PREFERRED EMBODIMENT

Figure 2:
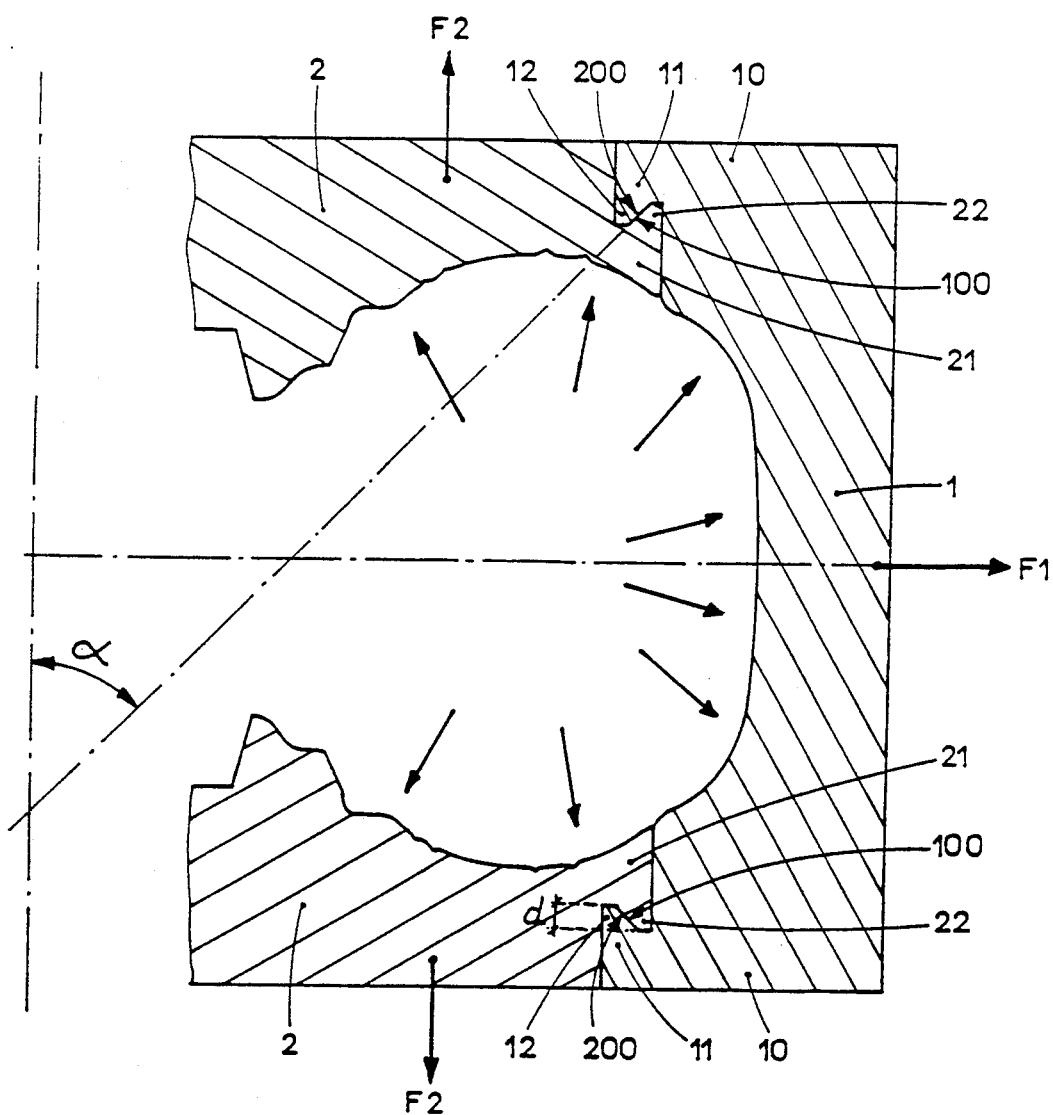
FIG. 2 is a similar view of a sector-type mold embodying the present invention.

There are numerous variants in the kinematics of sector-type molds. However, in all cases, the internal pressure is counteracted for by reactions R outside the mold, as indicated diagrammatically in FIG. 1. On the other hand, FIG. 2 shows an example of a mold according to the invention, the shells 2 and sectors 1 of which can in no case move apart under the action of the internal pressure.

Each sector 1 is provided at its lateral edges 10 with a protrusion 11 which extends radially towards the inside of the mold and is provided with a flange 12 which extends axially towards the axis of the mold. The radially outer end of each shell 2 is terminated by a complementary shaped formation and accordingly has a protrusion 21 provided with a flange 22. The said flanges 12 and 22 cooperate to hold the mold closed when the latter is subjected to an internal pressure which tends to move the shells 2 axially apart from each other and to push the sectors 1 radially outwards.

For this purpose, frustoconical seating surfaces 100 and 200 are provided on the flanges 12 and 22 of said sectors and shells. Said frustoconical surfaces 100 and 200 are inclined by an angle α with respect to the axis of the mold. They are inclined in such a manner that the extensions of the traces of these frustoconical surfaces on a meridian plane intersect on the radially inner side of the sector in question. The broken line (---) approximately parallel to the left edge of FIG. 2 is a base line parallel to the axis of the mold and the broken line (---) intersecting with the base line at angle α is the extension of a trace of one frustoconical surface. In order for the mold to remain closed at all times, the angle α must be calculated in such a manner that the effect of the internal pressure on the shells which tends to move the sectors towards the center of the mold (see effect of the forces $F_2$ on the sectors) is preponderant as compared with the effect on the internal pressure on the sectors (effect of forces $F_1$) which tends to move the sectors away from the center of the mold. It will be noted that the shells 2 cannot move axially away from the center of the mold. They are prevented from doing so by the protrusions 11 of the sectors.

In order to close such a mold, it is necessary to move the shells toward each other from their outward positions by at least the value of the dimension d in order to permit the sectors to approach their closing positions radially, that is to say, in order to permit the flanges 12 to clear the rims 22. The shells are then moved radially apart from each other to their final positions in engagement with the sectors.

In order to open it, it is necessary, first of all, to move each shell axially by at least the dimension d in order to permit the sectors to move apart radially; the shells are then free to move axially towards the outside.

The advantages of such a design are numerous. The invention makes it possible to lighten to the utmost the members which assure the kinematics of the mold, which need simply bear the parts of the mold and move them and need no longer withstand the molding pressure or keep the mold closed.

On the other hand, in the conventional design (see FIG. 1), it is always the members which assure the kinematics of the mold which withstand the internal pressure. For example, the sectors 1 are retained radially by a ring 3, provided that the latter is retained axially. The mold must be kept closed by the action of axial forces of reaction R which are developed by the press.

On the other hand, a self-locking mold in accordance with the invention is maintained firmly closed by itself when the internal pressure increases, and the mechanism which assures the kinematics of the mold no longer has the function of maintaining the mold closed.

Without going beyond the scope of the present invention, removable molding parts can be provided. In this case, the expression "mold" is not limited to the integrated molding parts. It is to be understood that it designates the support parts and the molding parts.

In this variant of the invention, the frustoconical resting surfaces which assure the locking are provided on the support parts, forming a resistant box within which the molding parts are mounted. For the resistant box there are present as many separable parts as there are molding parts. The molding box is then multidimensional; molding parts for an entire range of dimensions of tires can be mounted within it, if necessary, with wedge parts, the sole role of which is to fill the spaces between molding parts and resistent box.

The invention is shown in preferred form and by way of example, and modifications and variations can be made within the scope of the invention. The invention, therefore, is not intended to be limited to the particular form or embodiment described herein.

I claim:

1. A sector-type mold for the molding and vulcanizing of tires in which the mold includes outer sectors for molding the tire treads and shells for molding the side walls of the tire, said mold comprising a protrusion at the lateral edges of each sector which protrusion extends radially towards the axis of the mold, a flange on each protrusion which flange extends axially towards the inside of the mold and has a frustoconical surface included by an angle $\alpha$ with respect to the axis of the mold in such a manner that extensions of races of each frustoconical surface on a meridian plane intersect on the radially inner side of the sector in question, a complementary protrusion on the radially outer end of each shell and a flange on each complementary protrusion having a frustoconical surface inclined by the same angel $\alpha$ with respect to the axis of the mold.

2. A tire mold according to claim 1 in which said outer section and said shells have molding portions and support portions, said molding portions having shaping surfaces for contacting molding material, at least some of the molding portions being removable from the support portions, said frustoconical surfaces being on the support portions.

* * * * *

UNITED STATES PATENT AND TRADEMARK OFFICE
CERTIFICATE OF CORRECTION

PATENT NO. : 5,180,592

DATED     : Jan. 19, 1993

INVENTOR(S) : Laurent

It is certified that error appears in the above-identified patent and that said Letters Patent is hereby corrected as shown below:

Col. 2, line 2, "convention" should read --conventional--.

Col. 4, line 16, "races" should read --traces--;

line 24, "section" should read --sectors--.

Signed and Sealed this

Sixteenth Day of November, 1993

Attest:

BRUCE LEHMAN

Attesting Officer     Commissioner of Patents and Trademarks